June 5, 1956　　W. T. HARDISON　　2,749,261
MULTICONDUCTOR CABLE
Filed March 30, 1953
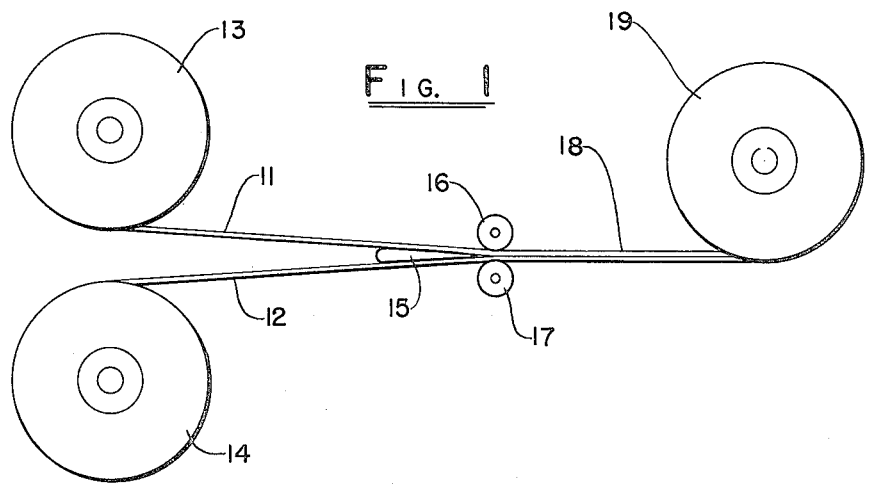
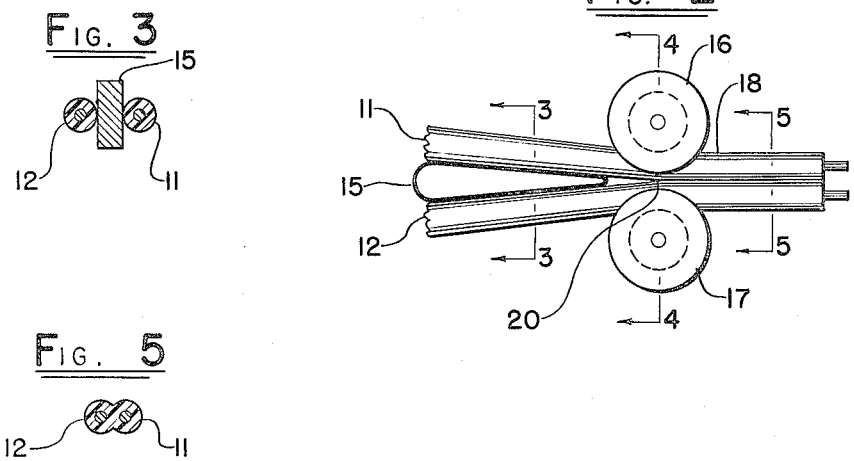
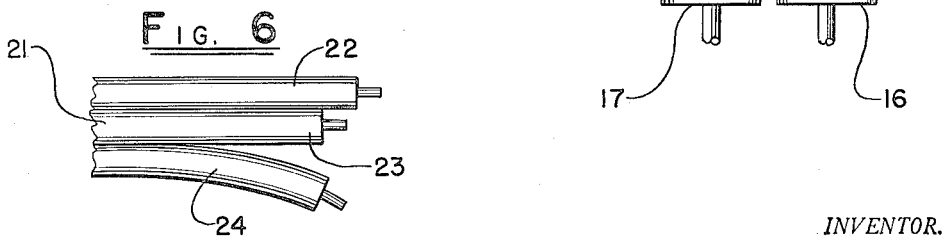
INVENTOR.
WILBUR T. HARDISON
BY *Herbert E. Kidder*
AGENT

United States Patent Office 2,749,261
Patented June 5, 1956

2,749,261

MULTICONDUCTOR CABLE

Wilbur T. Hardison, Riverside, Calif., assignor to Marlan E. Bourns

Application March 30, 1953, Serial No. 345,467

1 Claim. (Cl. 154—2.24)

The present invention relates to electrical wires, and more particularly to small electrical wires insulated with thermoplastic material which are combined to form a multiconductor cable. Under certain conditions, it is desirable to have several individually insulated wires attached permanently together in the form of a cable, the individual wires being separable if desired, and being differently colored to conform to color coding specifications. This type of cable is particularly desirable for "pig tail" lead wires for instruments, motors, and potentiometers.

My invention has for its primary object the provision of a new and improved form of multiconductor cable made up of two or more separately formed, thermoplastic covered wires which are joined together in a manner whereby they may readily be separated from one another. In instances where it is desired to have two or more insulated wires in the form of a cable, several fabrication methods are presently used. The insulated wires are sometimes twisted together. This has the disadvantage of being bulky and objectionable in appearance, as well as making it extremely difficult to separate one or more of the wires from the others, if it is desired to run the various wires of the cable to different points. Another method is to slide plastic or other similar tubing over the several insulated wires to hold them together. This is a tedious job, and it is impossible to separate one of the wires of the cable from the remainder without destroying the cover. A third means of combining two or more wires together to form a multiconductor cable is that of using a special extrusion die which molds insulation around the two bare wires during the process of manufacturing cable. This has several disadvantages. In pulling the wires apart, the insulation is frequently pulled entirely away from one wire, exposing the bare surface of the wire itself with no insulation covering it. Also, the manufacture of cables of this type involves the use of costly extrusion dies. Furthermore, it is not possible to combine several different individually colored insulated wires into one cable by this method inasmuch as one plastic material is used to produce the entire cable.

It is an object of my invention, therefore, to provide a simple, inexpensive, and effective method of producing multiconductor wire by bringing two or more thermoplastic covered wires into juxtaposition, and fusing their thermoplastic covering together along the contact area.

Another object of the invention is to provide a color-coded multiconductor cable, wherein the several wires making up the cable are covered with different-colored thermoplastic insulation. In this same connection, it is a further object of my invention to produce a cable which can readily be pulled apart without damaging the insulation on any of the conductors, and wherein any one conductor may be separated from the others without detaching the last-named conductors from one another.

Another object of my invention is to provide cable which may be composed of various insulated wires of any size and any color, and in any quantity of conductors as required. Wires of varying sizes may be combined within one cable if so desired, in the interest of providing larger wires to carry larger current.

Still a further object of the invention is to provide a method of fabricating multiconductor of the class described, which is capable of being used "on the job" to produce cable conforming with any color code specification, without requiring advance planning from the standpoint of special production of such cable by a cable manufacturer.

In carrying out my invention, I utilize a special device for combining into a cable, two or more wires, each insulated with a thermoplastic material, such as vinyl polymers and copolymers, polyethylene, and polyamide resin. For a more complete understanding of my invention, and the objects and advantages thereof reference is had to the accompanying drawings, wherein:

Figure 1 is a schematic diagram showing apparatus for combining individual wires to form a cable;

Figure 2 is an enlarged view of a portion of Figure 1, showing the heating element and pressure rolls;

Figure 3 is a transverse sectional view, taken at 3—3 in Figure 2;

Figure 4 is a view taken at 4—4 of Figure 2;

Figure 5 is a sectional view through the completed cable, taken at 5—5 of Figure 2;

Figure 6 is of a completed three-conductor cable, showing one wire stripped away from the others.

In the drawings, wires 11 and 12 are withdrawn from spools 13 and 14, respectively, and are brought together in side-by-side, parallel relationship. The two wires pass on opposite sides of a heating element 15 so that the adjacent surfaces of the thermoplastic insulation material is heated to the temperature at which such material becomes tacky. The insulation material of the wires may be any of the thermoplastic resins commonly used for the purpose, such as vinyl chloride, polyethylene or polyamide. Other thermoplastic insulation material may be used, of course, and these are merely given by way of example.

Immediately on leaving the heating element 15, the wires 11 and 12 pass between flanged rollers 16 and 17, which press the tacky, partially melted portions of the insulation together so that the insulation merges and fuses together to form an integral cable 18, which is then rolled onto a spool 19. Spool 19 may be motor driven so as to pull the wires along the course described.

The heating member and pressure rolls are shown in greater detail in Figure 2, where it is seen that wires 11 and 12 come together at a junction 20. By adjusting the heat of the element 15 and the pressure of rolls 16 and 17, it is possible to regulate the firmness of the junction 20 in such a manner that the wires 11 and 12 are held securely together yet may readily be pulled apart without destroying the insulation of either of the individually insulated wires. Preferably, the pressure and temperature are regulated so that fusion occurs along a contact area or strip substantially narrower in width than the outside diameter of the wires, the said fusion area forming a zone of weakness which is yieldable when the wires are pulled apart to permit separation of the wires from one another. This is best shown in Figure 5.

Figure 2 shows two wires being joined together to form a two-conductor cable. If it is desired to join three or more conductors together, it is necessary only to bring a third wire along side of one of the two wires in the two conductor cable, repeating the process of heating the adjacent surfaces of the thermoplastic covering, and pressing the third wire against the outside of the two conductor cable. Additional wires may be added as desired. Figure 6 shows a three conductor cable. A cable having three or more conductors may also be produced by simultaneously heating the adjacent surfaces of the thermoplastic coverings and then pressing the partially melted portions of the insulation together so that they merge and fuse together.

For color-coded multiconductor cable, wires 11 and 12 would have different colored insulation. The wires 11 and 12 may also be of different size, in which case the pressure rolls 16 and 17 would be shaped correspondingly to accommodate their respective wires.

While I have shown and described in some detail a particular embodiment of my invention, it will be understood that the invention is not limited to such details inasmuch as various modifications are possible without departing from the scope of the claim. For example, the wires 11 and 12 might be drawn through a die instead of through rollers 16 and 17, or pressure shoes might be used to press the wires together.

I claim:

The method of making a multiconductor cable comprising the steps of starting with two separate wires having thermoplastic coverings provided thereon, said wires and coverings being of substantially circular cross section, bringing said wires together in side-by-side relationship, locally heating narrow strips along adjacent sides of said coverings to the fusion temperature of the thermoplastic insulation material, said strips being appreciably narrower in width than the diameter of said coverings, and pressing said wires together so as to fuse said coverings together along the area of said narrow strips, said fused area forming a line of reduced strength down the center of said joined wires, whereby said wires can subsequently be pulled apart without damaging said coverings.

References Cited in the file of this patent

UNITED STATES PATENTS

| | | |
|---|---|---|
| 2,298,676 | Camp | Oct. 13, 1942 |
| 2,322,756 | Wallder | June 29, 1943 |
| 2,361,374 | Abbott | Oct. 31, 1944 |
| 2,387,566 | Custers | Oct. 23, 1945 |
| 2,413,032 | O'Brien | Dec. 23, 1946 |
| 2,425,294 | Morgan | Aug. 12, 1947 |
| 2,522,656 | Whalen | Sept. 19, 1950 |
| 2,628,998 | Frisbie | Feb. 17, 1953 |